United States Patent

Suzuki

[15] 3,677,032
[45] July 18, 1972

[54] SHELL TYPE NEEDLE BEARING

[72] Inventor: Toshio Suzuki, Fujisawa-shi, Japan

[73] Assignee: Nippon Seiko Kabushiki Kaisha, Tokyo, Japan

[22] Filed: Jan. 20, 1970

[21] Appl. No.: 4,247

[30] Foreign Application Priority Data

Jan. 22, 1969 Japan........................................44/4356
Jan. 22, 1969 Japan........................................44/4357
Jan. 22, 1969 Japan........................................44/4358

[52] U.S. Cl. ..............................64/17 A, 308/216, 308/237
[51] Int. Cl. .........................................F16d 3/24, F16c 19/00
[58] Field of Search .................308/216, 237, 241; 148/16.5, 148/39, 31.5; 64/17 A

[56] References Cited

UNITED STATES PATENTS

| | | | |
|---|---|---|---|
| 2,038,475 | 4/1936 | Brown | 308/216 X |
| 2,207,289 | 7/1940 | Fleischmann | 148/16.5 |
| 2,259,325 | 10/1941 | Robinson | 308/216 |
| 2,556,236 | 6/1951 | Strickland, Jr. | 148/39 X |
| 2,685,545 | 8/1954 | Sindeband | 148/31.5 X |
| 3,227,586 | 1/1966 | Spencer | 148/39 X |
| 3,275,389 | 9/1966 | Neilson et al. | 308/241 X |
| 3,478,540 | 11/1969 | Pitner | 64/17 A |

*Primary Examiner*—Martin P. Schwadron
*Assistant Examiner*—Irwin C. Cohen
*Attorney*—Harry G. Shapiro

[57] ABSTRACT

A shell type needle bearing capable of carrying an exceedingly heavy load. The outer ring of the bearing has a carburized layer on the roller contact surface and a non-carburized ductile and tough layer adjacent the carburized layer. The depth of the carburized layer is sufficient to resist the shearing stresses of the bearing load while the depth of the ductile layer is sufficient to resist cracking from sudden shock.

7 Claims, 13 Drawing Figures

INVENTOR.
TOSHIO SUZUKI

BY Harry G. Shapiro

ATTORNEY

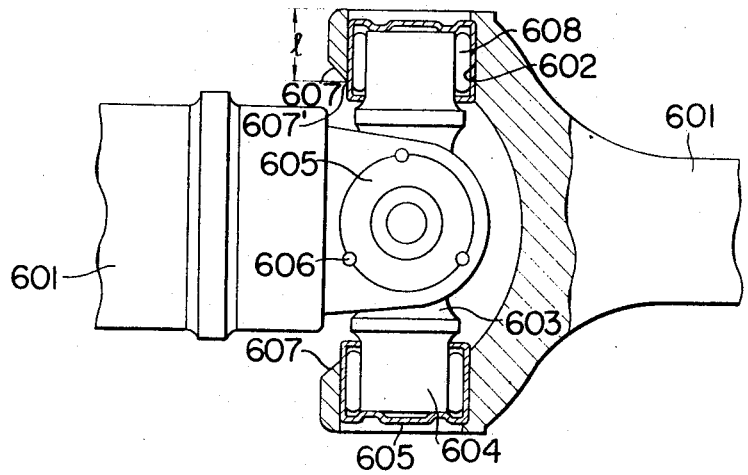
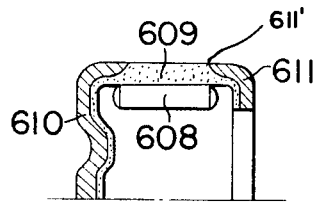
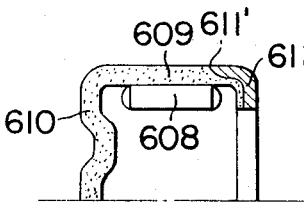
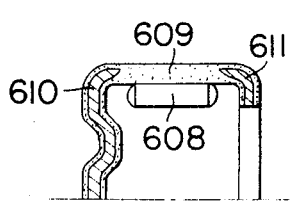
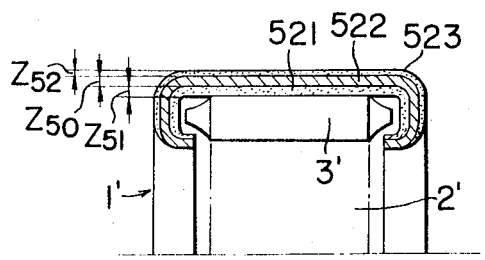
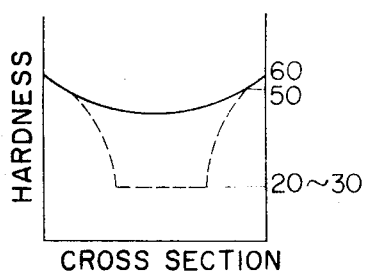

SHELL TYPE NEEDLE BEARING

The present invention relates generally to a steel shell type needle bearing and more particularly an improved steel shell type needle bearing which can carry an exceedingly higher load as compared with the conventional needle bearing having the same size.

In order to assist in an understanding of the present invention, certain terms employed herein are defined as follows:

1. Cementation or carburization applies generally to the surface hardening process for hardening the surface layer of steel parts by cementation, carburization, nitriding, carbonitrizing followed by quenching and or tempering.

2. Carburized layer is an effectively hardened layer obtained by the above hardening process.

In a ball-and-roller bearing or antifriction bearing, the rolling bodies are pressed against the surface of the race so that flaking or spalling occur due to surface fatigue under the action of repeated stresses and deformation occurs due to the yielding of the material. Such fatigue failures are also observed in a bearing which is carburized so that the carburized surface layer must satisfactorily resist the stress caused by the contact of the rolling element with the surface of the race.

The present invention provides an improved shell type needle bearing whose shell type outer ring is tough enough to resist impact shock, thereby preventing the cracking, and can operate under heavy loads even with a limited thickness of the shell type outer ring.

According to one embodiment of the present invention, a tough layer is formed in the surface of the outer ring upon which the rollers contact while the outer surface of the outer ring remains uncarburized.

Another object of the present invention is to provide an improved shell type needle bearing having a wear and damage resistant outer surface. In another embodiment of the present invention, a thin carburized layer is formed in the outer surface of the shell type outer ring of the bearing so that no flaw is produced upon the outer surface of the outer ring during handling and mounting of the bearing.

A further object of the present invention is to provide an improved shell type needle bearing suited for use with a cross joint or universal joint. According to the present invention, the portion of the outer surface of the outer ring which contacts the edge of the cut-out portion of a bore in the joint for receiving the bearing is not carburized so as to form a ductile or tough layer, while the inner surface or at least the race of the outer ring of the bearing is carburized throughout its whole thickness.

The above objects and other objects and the advantages of the invention will be more apparent from the following descriptions referring to the accompanying drawings, in which.

FIGS. 4, 5, 6, 7, and 8 are fragmentary longitudinal sectional views illustrating embodiments of the present invention;

FIG. 9 shows shell type needle bearings attached to a cross universal joint;

FIGS. 10, 11, and 12 are fragmentary longitudinal sectional views of embodiments of the present invention suited for use with the cross universal joint shown in Fig. 9; and FIG. 13 shows the relationship between the hardness and the carburized depth.

Figure 1:
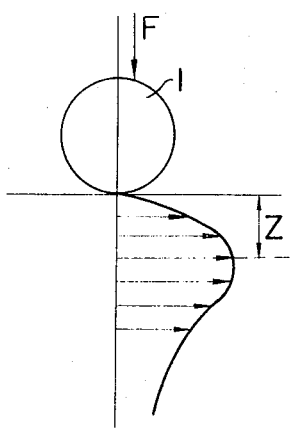
FIG. 1 shows the relationship between the carburized depth and the stress produced when a rolling element and a contact surface are pressed against each other.
Figure 2:
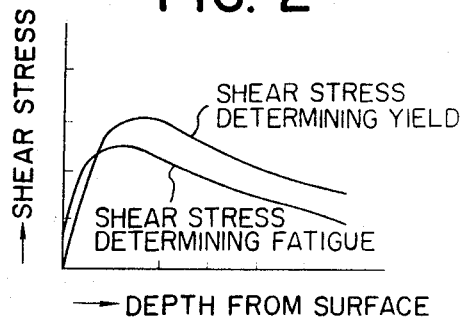
FIG. 2 shows the relationship between the shearing stresses and the carburized depth on the contact surface under load.

Referring to FIG. 1, the relationship between the carburized depth of a bearing race and the stress in the race in the plane at a right angle relative to the axis of the bearing will be described. When only the pure radial load F is applied to the rolling body 1, the stress distribution curve in the race is similar to a parabola and the stress becomes a maximum at the depth Z from the point of contact between the rolling element 1 and the surface of the race. On both sides of the maximum stress point, the stresses are gradually reduced. FIG. 2 shows the graph illustrating the relationship between the shearing stress and the carburized depth in the race for explanation of the determination of both of the fatigue failure and the yield point based upon the shearing stress theory. As seen from Fig. 2, both of the shearing stresses determining the fatigue and the yield point respectively are maximum at a certain depth from the surface.

Therefore it is seen that the carburized depth of the outer ring of the bearing must have a sufficient depth to resist the shearing stresses which determine the fatigue and the yield point as described above.

Figure 3:
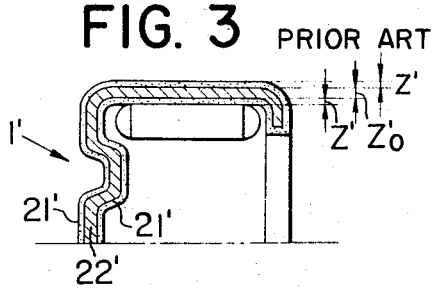
FIG. 3 is a fragmentary longitudinal sectional view of a conventional shell type needle bearing for comparison with the present invention.

In the conventional shell type needle bearing, as shown in Fig. 3, the outer ring is formed by drawing a relatively thin steel plate which is then carburized at both surfaces thereof so as to form the carburized layers 21'. But it is noted that the core (a ductile and tough layer of low carbon content) 22' is left uncarburized so that the outer ring itself may have sufficient ductility and toughness to prevent the cracking thereof due to impact. To increase the load carrying capacity of the bearing, it is only necessary to increase the carburized depth $Z'$ of the layer 21', but in doing so the ductile and tough core layer 22' will be inevitably reduced in depth $Z_0$ so that the average hardness in the direction of the thickness of the outer ring will be increased. Consequently, the outer ring can only absorb less impact energy and tends to crack from impact load.

Therefore there are serious problems of loading and mounting these bearings when they are used as bearings for cross joints which are subject to relatively large impact loads; as bearings of machines which must withstand heavy loads; as bearings to which are applied thrust loads; as bearings whose outer rings must be partly extended from their housings or bearing supporting members (for example, when installed in the bore of the yoke for the cross joint which bore is partly cut off), and so on.

Because of the limited thickness of the outer ring, it has been very difficult to increase the case depth or carburizing depth in order to improve the load capacity and yet provide the required ductility of the outer ring.

Figure 4:
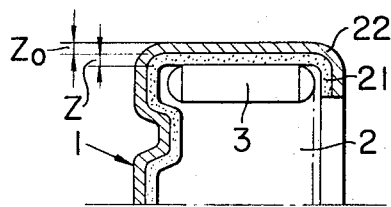

Referring to Fig. 4, a first embodiment of the present invention, a shell type needle bearing having one face thereof closed, will be described. The shell type needle bearing 1 has an outer ring 2 and a needle-shaped rolling body 3. The outer ring 2 has a carburized layer 21 on its inner surface and has a ductile and tough outer layer 22 which is not carburized. The carburized layer 21 has a depth Z sufficient to resist the shearing stresses under the load as described hereinabove with reference to Figs. 1 and 2. The ductile or tough layer 22 has a depth $Z_0$ sufficient to resist sudden impact or shock so as to effectively prevent cracking.

Figure 5:
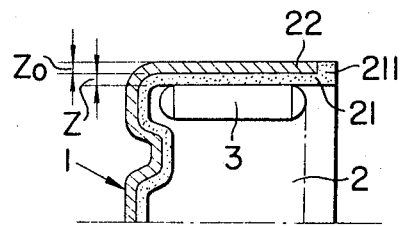

FIG. 5 illustrates a second embodiment of the present invention, a shell type needle bearing having one face thereof closed. The annular peripheral surface on the side of the opened face of the outer ring 2 as a carburized layer 211 which is continuous or integral with the inner carburized layer 21. The second embodiment can be advantageously used when the outer ring 2 is fitted into a bearing box or housing which is harder than the ductile or tough layer 22 because the expansion of the ductile or tough layer 22 between the inner surface of the bearing box or housing and the layer 21 of the outer ring 2 can be effectively prevented.

In the above first and second embodiments, the bottom or the closed face of the outer ring 2 is fitted into a bearing box or housing and held in position. But it will be noted that when both of the faces of the outer ring 2 are not pressed against bearing retaining members or the like, the layers 211 may be formed in both of the faces of the outer ring. That is, depending upon the types and applications of the bearings, the locations and number of layers 211 may be suitably varied.

Figure 6:
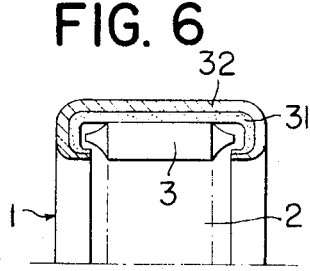

FIG. 6 shows a third embodiment of the present invention applied to a shell type needle bearing having both of the faces thereof opened. In this case, an inner case 31 and a ductile or tough layer 32 are formed as shown.

In the above first, second, and third embodiments, a layer 21 or 211 having an effective carburized depth Z sufficient to enable the race of the outer ring 2 to resist the shearing stresses under the load is formed only on the inner surface or contact surface between the outer ring 2 and the roller 3, while the outer surface layer of the outer ring 2 is not carburized, thus leaving a ductile or tough layer 22. This means that the effective carburized depth Z of the layer 21 may be made about twice as much as that of the conventional shell type needle bearing having the same shell thickness while the ductile or tough layer 22 remains the same. Consequently, the load capacity can be increased. When the effective depth Z is made equal to that of the conventional bearing having the same thickness of the outer ring, the ductile or tough layer can have a deeper depth so that the impact or shock energy exerted upon the bearing can be effectively absorbed.

Figure 7:
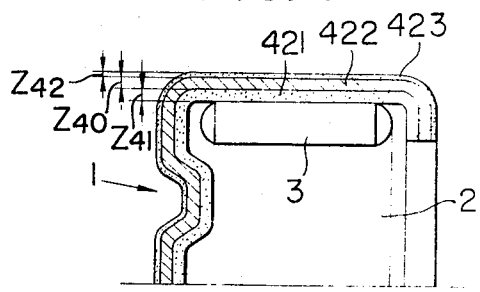

It is sometimes desired to provide wear resistance on the outer surface of the outer ring 2 to prevent the damage caused during handling and mounting of the bearing. Referring to FIG. 7, illustrating a fourth embodiment of the present invention, a thin outer case 423 is formed in the outer surface of the outer ring 2 to a depth Z42 of the order of 5 to 20$\mu$. The ductile or tough layer 422 remains between the outer carburized layer 423 and the inner carburized layer 421 having an effective depth sufficient to resist the shearing stresses or load as described above. The light depth Z42 from 5 to 20$\mu$ of the outer layer 423 may be achieved by applying over the outer surface of the outer ring a carburization inhibiting plating or mask which is thinner than the ordinary plating or mask which completely inhibits the carburization. The depth or thickness Z40 of the ductile or tough layer 422 is of course made sufficient to resist sudden impact or shock, thereby effectively preventing cracking.

FIG. 8 illustrates a fifth embodiment of the present invention applied to a shell type needle bearing having both of its faces opened with inner and outer carburized layers 521 and 523 and with the ductile or tough layer 522 interposed therebetween.

In the above described fourth and fifth embodiments of the present invention, the depth of the outer layer 423 or 523 is reduced as compared with the conventional bearing so that the case depth Z41 or Z51 of the inner layer 421 or 521 may be increased accordingly even though the overall thickness of the shell or the outer ring is limited. Therefore the load capacity can be increased as compared with the conventional bearing having the same shell thickness. Since the outer surface of the outer ring 2 is carburized, no surface damage is produced upon the outer surface of the bearing during handling and mounting so that a bearing of the present invention can be handled and mounted in the same manner as a conventional bearing. Furthermore it is noted that the ductile or tough layer 422 or 522 may be displaced outwardly from the contact surface of the race, as opposed to the conventional bearing in which the ductile or tough layer is formed in the center portion of the shell. Additionally, the thickness of the shell or outer ring may be reduced even when the inner layer 421 or 521 has the same case depth Z41 or Z51 as that of the conventional bearing. When the thickness of the shell or outer ring 2 remains unchanged from that of the conventional bearing, the case depth of the inner surface may be advantageously increased. If required, the thickness of the ductile or tough layer 422 or 22 may be increased because the depth of the outer layer 423 or 523 is reduced. Thus an ideal shell type needle bearing is provided which has a very heavy load capacity, is wear resistant enough to prevent damage to the outer surface of the outer ring when handled or mounted, and can sufficiently resist sudden impact or shock.

Next referring to FIGS. 9, 10, 11, and 12, a sixth, seventh and eighth embodiments of the present invention suited for use in a cross universal joint of an automobile will be described. In the cross universal joint, needle bearings 605 are generally fitted into bores 602 of a yoke 601 and securely held in position by means of securing members 606 so as to receive trunions 604 of a spider 603. A portion of each bore 602 is generally slantingly cut out as shown at 607, and the length L of the cut-out portion is generally shorter than the width of the bearings so that the bearing tends to deform between the trunion 604 and the yoke 601 during operation because of the eccentric load applied to the joint and the deflections of the trunion 604 and the yoke 601. Since the portion of the bearing exposed through the cut-out portion of the bore 602 is not supported, the portion of the outer ring of the bearing in contact with the edge 607' of the cut-out portion tends to deflect outwardly. In the conventional shell type needle bearing, the above described contact portion has a hardness substantially equal to that of the race of the outer ring so that a crack tends to initiate from the above described contact portion, thus resulting in the earlier failure of the outer ring.

In order to eliminate the above described defect encountered in the conventional bearing, the present invention contemplates not to carburize or carburize only to a very light case depth the portion of the outer ring which contacts the edge 607' while increasing the case depth of the race of the outer ring to such an extent that the case or carburized layer can sufficiently resist the shearing stresses which determine the yield point and the fatigue of the case. Thus the above described defect can be eliminated and the load capacity can be increased in a shell type needle bearing of the present invention having the same dimensions and the same shell or outer ring thickness as those of a conventional bearing.

In the sixth embodiment of the present invention, illustrated in FIG. 10, the race or groove 609 upon which rolls the roller 608 is carburized by the "whole carburization" which will be described in more detail hereinafter. The closed face 610 and the flange portion 611 are partially carburized as shown. The portion 611' of the flange portion 11 contacts with the edge 607' of the cut-out portion of the bore 602.

In the seventh embodiment of the present invention, illustrated in FIG. 11, only one side of the flange portion 611 is not carburized as shown while the remaining portion of the outer ring is carburized by the "whole or total" carborization. In the eighth embodiment of the present invention, illustrated in FIG. 12, the race 609 of the outer ring is carburized by the "whole or total" carburization while the remaining portion of the outer ring has both its surfaces carburized as shown.

In the above sixth, seventh, and eighth embodiments of the present invention, it is noted that the race portion of the outer ring is totally carburized throughout its thickness so that the race can resist a relatively heavy load. On the other hand, the remaining portion of the outer ring is totally carburized throughout its thickness as in the case of the race except the portion of the flange 611 which contacts the edge 607' of the cut-out portion of the bore 602. Alternatively, the remaining portion of the outer ring except the race 609 thereof may have one or both of its surfaces carburized partly. Thus the flange portion 611 can resist the impact and bending force and the closed face portion can prevent cracking.

Referring to FIG. 13, the "whole or total" carburization will be explained. In short, the "whole or total" carburization means that a part is carburized throughout its whole thickness. Generally the blank from which the shell is formed has a hardness of Rockwell C20 to C30. When such blank is carburized, the hardness in the effective carburized depth is about Rockwell C50, but when the blank is totally or wholly carburized throughout its whole thickness, the hardness can be increased above the original hardness of the blank, preferably to Rockwell C50.

What is claimed is:

1. A roller bearing comprising a cylindrical section forming an outer ring, at least one end of the cylindrical section being formed to provide an inturned portion, the cylindrical section and the inturned portion having an inner surface and an outer surface, the inner surface having a carburized layer, a portion of the inner surface carburized layer extending to the outer surface, through said cylindrical section and the remainder of the outer ring including a ductile tough metal extending from at least one inturned portion into a part of the cylindrical section of the outer ring.

2. The roller bearing according to claim 1 wherein the carburized layer on one inturned portion extends from the inner surface to the outer surface of the inturned portion.

3. The roller bearing according to claim 1 wherein the outer surface of the cylinder portion and the inturned portion have a continuous carburized layer.

4. The roller bearing according to claim 1 wherein the ductile tough metal of the cylindrical portion extends to the outer surface of at least one inturned portion.

5. A shell type needle bearing and universal joint assembly comprising at least one yoke having at least one bore therein for mounting a shell type needle bearing, the bore having a cut out portion, a shell type needle bearing having roller members and an outer ring mounted in the bore, the outer ring extending into the cut out portion of the bore, the outer ring including an outer surface and an inner surface, the inner surface having a hardened carburized layer, portions of the inner surface carburized layer in contact with the roller members extending to the outer surface, through said outer ring and the outer ring having ductile tough metal disposed radially outward from portions of the carburized layer on the inner surface thereof.

6. The shell type needle bearing and universal joint assembly according to claim 5 wherein ductile tough metal extends from the inner carburized layer to the outer surface to be positioned on the outer surface in the cut out portion of the bore.

7. A shell type needle bearing and universal joint assembly according to claim 5 wherein the entire outer surface has a carburized layer.

* * * * *